US00RE40952E

(19) United States
(12) Reissued Patent
Olaru

(10) Patent Number: US RE40,952 E
(45) Date of Reissued Patent: Nov. 10, 2009

(54) METHOD AND APPARATUS FOR MEASURING THE TEMPERATURE OF MOLTEN MATERIAL IN A MOLD CAVITY

(75) Inventor: George Olaru, Georgetown (CA)

(73) Assignee: Mold-Masters (2007) Limited, Georgetown, Ontario (CA)

(21) Appl. No.: 11/847,881

(22) Filed: Aug. 30, 2007

Related U.S. Patent Documents

Reissue of:
(64) Patent No.: 6,936,199
Issued: Aug. 30, 2005
Appl. No.: 10/338,744
Filed: Jan. 9, 2003

U.S. Applications:
(60) Provisional application No. 60/346,279, filed on Jan. 9, 2002.

(51) Int. Cl.
*B29C 45/78* (2006.01)

(52) U.S. Cl. ..... 264/40.6; 264/328.15; 425/144; 425/547; 425/549

(58) Field of Classification Search ..... 425/144, 425/547, 549, 143; 264/40.6, 328.15
See application file for complete search history.

(56) References Cited

U.S. PATENT DOCUMENTS

| | | | |
|---|---|---|---|
| 4,609,516 | A | 9/1986 | Krishnakumar et al. |
| 4,923,387 | A | 5/1990 | Gellert |
| 5,139,724 | A | 8/1992 | Hofstetter et al. |

(Continued)

FOREIGN PATENT DOCUMENTS

| | | | |
|---|---|---|---|
| DE | 299 09 535 | U1 | 8/1999 |
| EP | 0655306 | | 5/1995 |
| EP | 0655306 | A3 | 5/1995 |
| EP | 0 655 306 | A2 | 5/1995 |
| FR | 2829058 | B1 | 3/2003 |
| JP | 58051126 | A | 3/1983 |
| JP | 58142831 | A | 8/1983 |
| JP | 5004262 | | 1/1993 |
| JP | 9159539 | | 6/1997 |
| JP | 2001225349 | | 8/2001 |
| WO | 9846410 | A1 | 10/1998 |
| WO | 9933633 | A1 | 7/1999 |
| WO | 0048815 | A1 | 8/2000 |
| WO | 02072331 | | 9/2002 |
| WO | 02081177 | | 10/2002 |

OTHER PUBLICATIONS

"Thermoset Injection Mold Design Tips" Article, Plastics Engineering Company, Sheboygan, Wisconsin, U.S.A., pp. 1–11, dated Jun. 8, 2000.
Extended European Search Report issued Nov. 27, 2007 in respect of EP Patent Application No. 07018109.04.
System Description, PRIAMUS Fill' Type 7001A, ED. 1101.
Pressure and Temperature Control of Multicavity Injection Mold with Hydraulic Valve Gate Hot Mold System Disclosure 30145, Published in Research Disclosure, May 1989.
International Search Report for Appln. No. PCT/US03/00539, issued Apr. 15, 2003, 6 pages.

*Primary Examiner*—Tim Heitbrink
(74) *Attorney, Agent, or Firm*—Ridout & Maybee LLP

(57) ABSTRACT

An injection molding apparatus comprises a manifold having a manifold channel for receiving a melt stream of molten material under pressure and delivering the melt stream to a nozzle channel of a nozzle. A mold cavity receives the melt stream from the nozzle and the nozzle channel communicates with the mold cavity through a mold gate. A thermocouple is coupled to the mold core of the mold cavity in order to measure the temperature of the molten material in the mold cavity.

25 Claims, 6 Drawing Sheets

U.S. PATENT DOCUMENTS

| | | | |
|---|---|---|---|
| 5,226,596 | A | 7/1993 | Okamura |
| 5,235,737 | A | 8/1993 | Gellert |
| 5,346,388 | A | 9/1994 | Gellert |
| 5,421,716 | A | 6/1995 | Gellert |
| 5,518,389 | A | 5/1996 | Nonomura et al. |
| 5,556,582 | A | 9/1996 | Kazmer |
| 5,736,173 | A | 4/1998 | Wright et al. |
| 5,772,933 | A | 6/1998 | Kotzab |
| 5,804,228 | A | 9/1998 | Kofsman et al. |
| 5,871,786 | A | 2/1999 | Hume et al. |
| 6,030,573 | A | 2/2000 | Matsumoto et al. |
| 6,077,067 | A | 6/2000 | Gellert |
| 6,090,318 | A | 7/2000 | Bader et al. |
| 6,171,541 | B1 | 1/2001 | Neter et al. |
| 6,176,700 | B1 | 1/2001 | Gellert |
| 6,220,850 | B1 | 4/2001 | Catoen et al. |
| 6,261,084 | B1 | 7/2001 | Schmidt |
| 6,264,460 | B1 | 7/2001 | Wright et al. |
| 6,276,922 | B1 | 8/2001 | Huston et al. |
| 6,280,665 | B1 | 8/2001 | Kotzab |
| 6,287,107 | B1 | 9/2001 | Kazmer et al. |
| 6,332,770 | B1 | 12/2001 | Oueslati et al. |
| 6,394,784 | B1 | 5/2002 | Gellert et al. |
| 6,497,568 | B1 | 12/2002 | Aasted |
| 6,529,796 | B1 | 3/2003 | Kroeger et al. |
| 6,561,789 | B2 | 5/2003 | Gellert et al. |
| 6,638,053 | B2 | 10/2003 | Gellert et al. |
| 2001/0016239 | A1 | 8/2001 | Koch et al. |
| 2004/0084794 | A1 | 5/2004 | Frey |
| 2004/0113303 | A1 | 6/2004 | Frey |
| 2004/0135277 | A1 | 7/2004 | Frey |

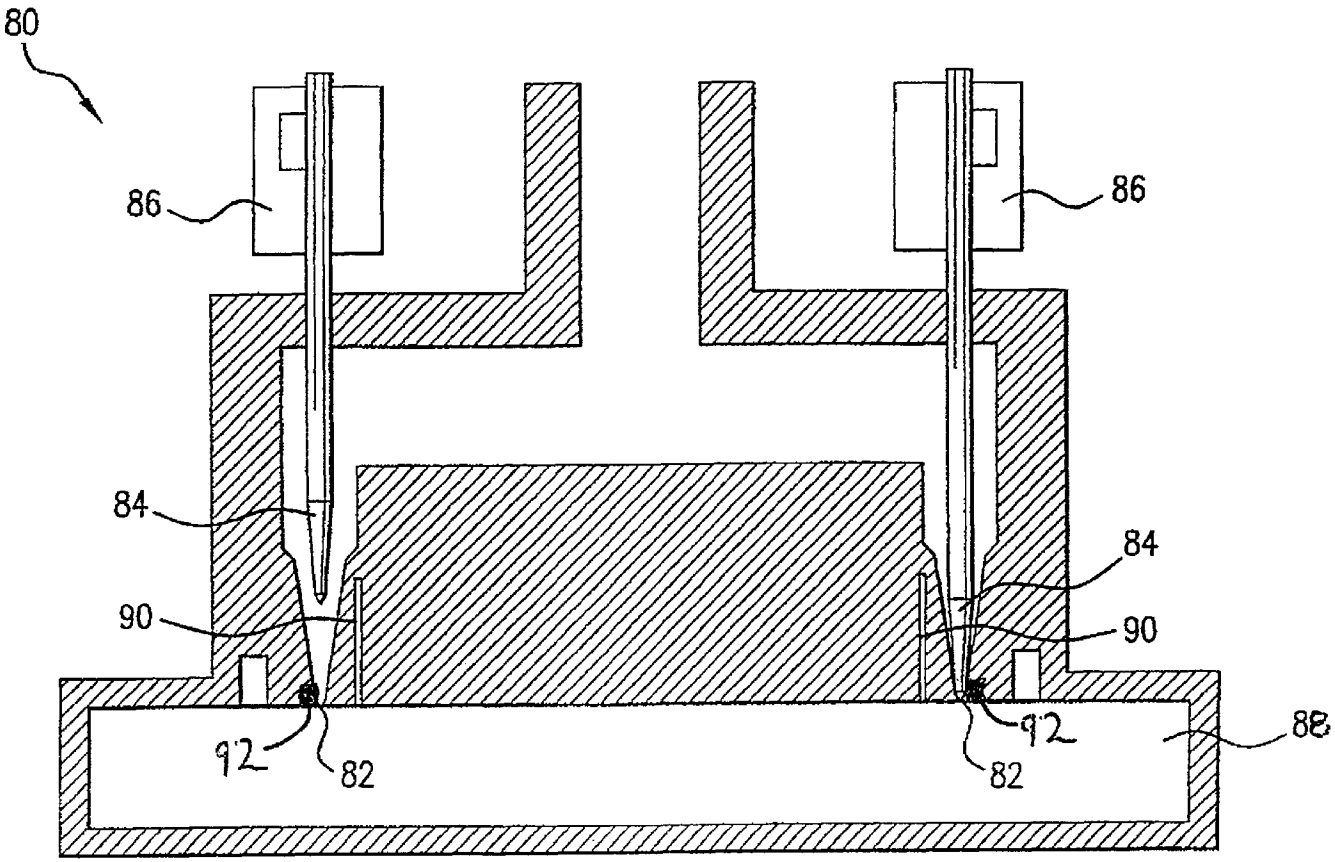
FIG.6
Amended

METHOD AND APPARATUS FOR MEASURING THE TEMPERATURE OF MOLTEN MATERIAL IN A MOLD CAVITY

Matter enclosed in heavy brackets [ ] appears in the original patent but forms no part of this reissue specification; matter printed in italics indicates the additions made by reissue.

This application claims the benefit of U.S. Provisional Application No. 60/346,279 filed on Jan. 9, 2002.

FIELD OF THE INVENTION

The present invention relates to an injection molding apparatus, in particular, a method and apparatus for measuring the temperature of molten material in a mold cavity.

BACKGROUND OF THE INVENTION

Accurate control of temperature in an injection molding apparatus is fundamental to maintaining control of throughput rate and product quality in an injection molding process. Heaters are typically provided to heat the melt flowing through the manifold and nozzles and cooling channels are provided to cool the melt in the mold cavities. During injection, the melt must be maintained within a temperature range dictated by the melt material. Once the melt has been injected into the mold cavities, the melt is cooled at a predetermined rate to produce molded parts. The predetermined cooling rate is calculated based at least in part on the temperature of the melt as it enters the mold cavities.

In a multi-cavity injection molding apparatus, the temperature of the melt entering the mold cavities often varies from one mold cavity to the next. As such, the optimum cooling time for the plastic in each mold cavity may be slightly different. For injection molding applications in which semicrystalline resins are used, this temperature variation often results in the production of molded articles that are of insufficient quality.

A common application of semicrystalline resins is in the production of polyethylene terephthalate (PET) preforms. In order to produce high quality preforms, the semicrystalline resin must be cooled in the mold cavity for a sufficient period of time to allow the preform to solidify before being ejected, while avoiding the formation of crystalline portions. Crystalline portions typically form in the bottom portion of the preform adjacent the mold gate. The crystalline portions cause the preform to become brittle so that it may crack when it is blow molded.

There have been many attempts to optimize the cooling of PET preforms in order to produce high quality molded products efficiently. For example, U.S. Pat. No. 6,171,541 entitled "Preform Post-Mold Cooling Method and Apparatus" issued to Husky Injection Molding Systems Ltd. on Jan. 9, 2001, discloses a rapid injection molding process where the molded articles are ejected from the mold before the cooling step is complete.

U.S. Pat. No. 6,276,922 entitled "Core Fluid Velocity Inducer" issued to Husky Injection Molding Systems Ltd. on Aug. 21, 2001, discloses an inducer located at the outlet of a cooling supply tube for improving the circulation of the cooling supply throughout the core.

U.S. Pat. No. 6,176,700 entitled "Injection Molding Cooled Cavity Insert" issued to Jobst Gellert on Jan. 23, 2001, discloses an injection molding apparatus having a cavity insert with a cooling fluid flow channel extending between integral inner and outer portions thereof. The cavity insert attempts to improve the cooling process for molded articles. The nozzle includes a thermocouple that measures the temperature of the molten material as it leaves the nozzle.

Despite all of the attempts to improve the cooling process for molded articles, the method of measuring the temperature of the molten material in the mold cavity has not improved. It is desirable to obtain additional temperature measurements at the outlet of the nozzle because large temperature variations may occur in this area. It is therefore an object of the present invention to provide a method and apparatus for measuring the temperature of the molten material in the mold cavity.

SUMMARY OF THE INVENTION

In an embodiment of the present invention, an injection molding apparatus includes a manifold, a nozzle having a nozzle heater and a nozzle temperature sensor, a mold cavity having a mold core and a melt temperature sensor, and a controller. The controller is electrically coupled to the nozzle temperature sensor, the melt temperature sensor and the nozzle heater and adjusts the heater output depending on data from the temperature sensors.

In another embodiment of the present invention, an injection molding apparatus includes a manifold, a nozzle having a nozzle heater and a nozzle temperature sensor, a mold cavity having a core and a melt temperature sensor disposed in the mold core; and a controller. The controller is electrically coupled to the nozzle temperature sensor, the mold temperature sensor and the nozzle heater and adjusts the heater output depending on data from the temperature sensors.

In a further embodiment of the present invention, an injection molding apparatus includes a manifold, a plurality of nozzles each having a nozzle heater and a nozzle temperature sensor, at least one cavity having a melt temperature sensor disposed adjacent to the mold cavity; and a controller. The controller is electrically coupled to the nozzle temperature sensors, the melt temperature sensor and the nozzle heaters and adjusts the heater outputs depending on data from the temperature sensors.

BRIEF DESCRIPTION OF THE DRAWINGS

Embodiments of the present invention will now be described more fully with reference to the accompanying drawings in which:

FIG. 6 is a schematic sectional view of an injection molding apparatus having gates equipped with valves for adjusting the gate size.

DETAILED DESCRIPTION OF THE PREFERRED EMBODIMENT

Figure 1:
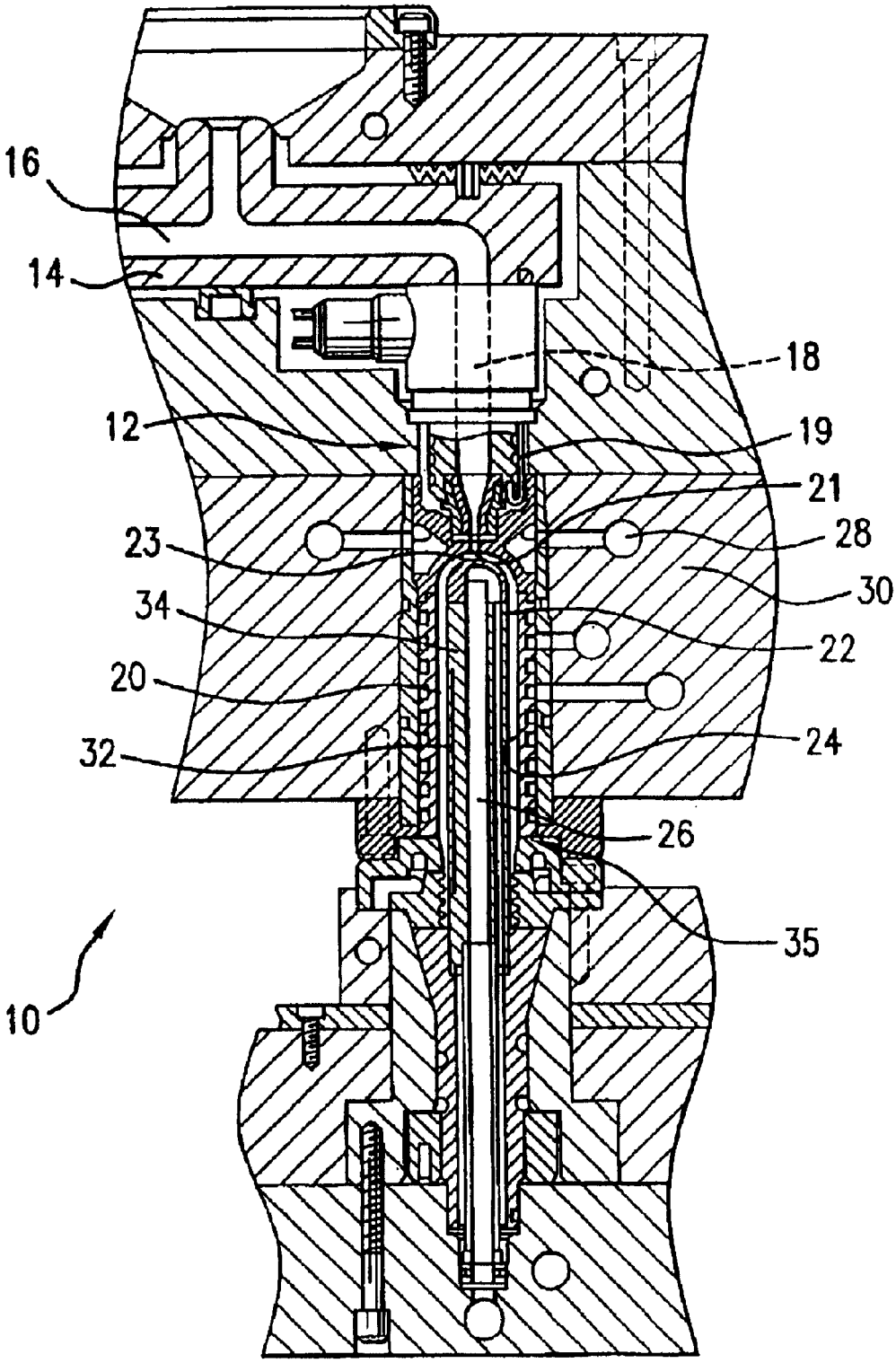
FIG. 1 is a sectional view of a portion of a multi-cavity injection molding apparatus according to an embodiment of the present invention.

Referring now to FIG. 1, a portion of a multi-cavity injection molding apparatus for molding bottle preforms is shown and is generally identified by reference numeral 10. This injection molding apparatus is similar to that disclosed in U.S. Pat. No. 6,176,700 to Gellert, issued on Jan. 23, 20011, the contents of which are incorporated herein by reference. As shown, the injection molding apparatus 10 includes a manifold 14 having a manifold melt channel 16 through which molten material flows. A nozzle channel 18 of a nozzle 12 receives the molten material from the manifold 14 and directs the flow of the molten material through a mold gate 21 into a mold cavity 20 allowing the molded bottle preforms (not shown) to be formed. A nozzle thermocouple 19 is provided in the nozzle 12 to measure the temperature of the molten material as it is injected into the mold cavity 20.

The mold cavity 20 is provided in a cavity plate 30 and is delimited by a first mold cavity surface 34 of a mold core 22 and a second, mold cavity surface 24 defined by a mold plate assembly 35. The first mold cavity surface 34 of the mold core 22 contacts an inner surface of the bottle preform and the second mold cavity surface 24 contacts an outer surface of the bottle preform. A central fluid cooling duct 26 extends through the mold core 22. Coolant flows through the central fluid cooling duct 26 to cool the molded bottle preform. The second mold cavity surface 24 of the mold cavity 20 is cooled via cooling lines 28, which extend through the cavity plate 30. Suitable coolants include water, oil or gas. The central fluid cooling duct 26 of the mold core 22 and the cooling lines 28 of the cavity plate 30 typically do not share the same coolant.

The injection molding apparatus 10 further includes a thermocouple 32, which extends through the mold core 22, along a portion of the length thereof. A hole is drilled in the mold core 22 for receiving the thermocouple 32. The thermocouple 32 measures the temperature of the molten material in the mold cavity 20.

In operation, the melt stream flows under pressure though the manifold channel 16 into the nozzle channels 18 of a plurality of nozzles 12 of the injection molding apparatus 10. The melt stream is then injected into the mold cavities 20. Upon completion of injection, each mold cavity 20 is cooled by the coolant, which flows through the respective central fluid cooling ducts 26. Once a predetermined cooling time has elapsed the molded preforms are ejected from the mold cavities 20.

The cooling rate of the molded preforms is dependent on the temperature of the coolant flowing through the central fluid cooling duct 26 and the temperature of the coolant flowing through the cooling lines 28 of the cavity plate 30. Because injection molding apparatus' having many mold cavities 20 typically circulate the same coolant through the central fluid cooling ducts 26 of each of the mold cavities 20, it is possible that the coolant may not be at the exact same temperature as it passes through each individual mold cavity 20. As such, the cooling rate of each mold cavity 20 will be different.

By obtaining two independent temperature measurements of the molten material near the mold gate 21 (i.e., in the mold cavity 20 and in the nozzle 12), the accuracy and reliability of the measurements is increased. Further, the thermocouple 32 on the mold core 22 allows the cause of crystallization in a preform to be more easily determined. It will be appreciated that temperatures may be measured by thermocouple 32 and nozzle thermocouple 19 sequentially or simultaneously.

Figure 2:
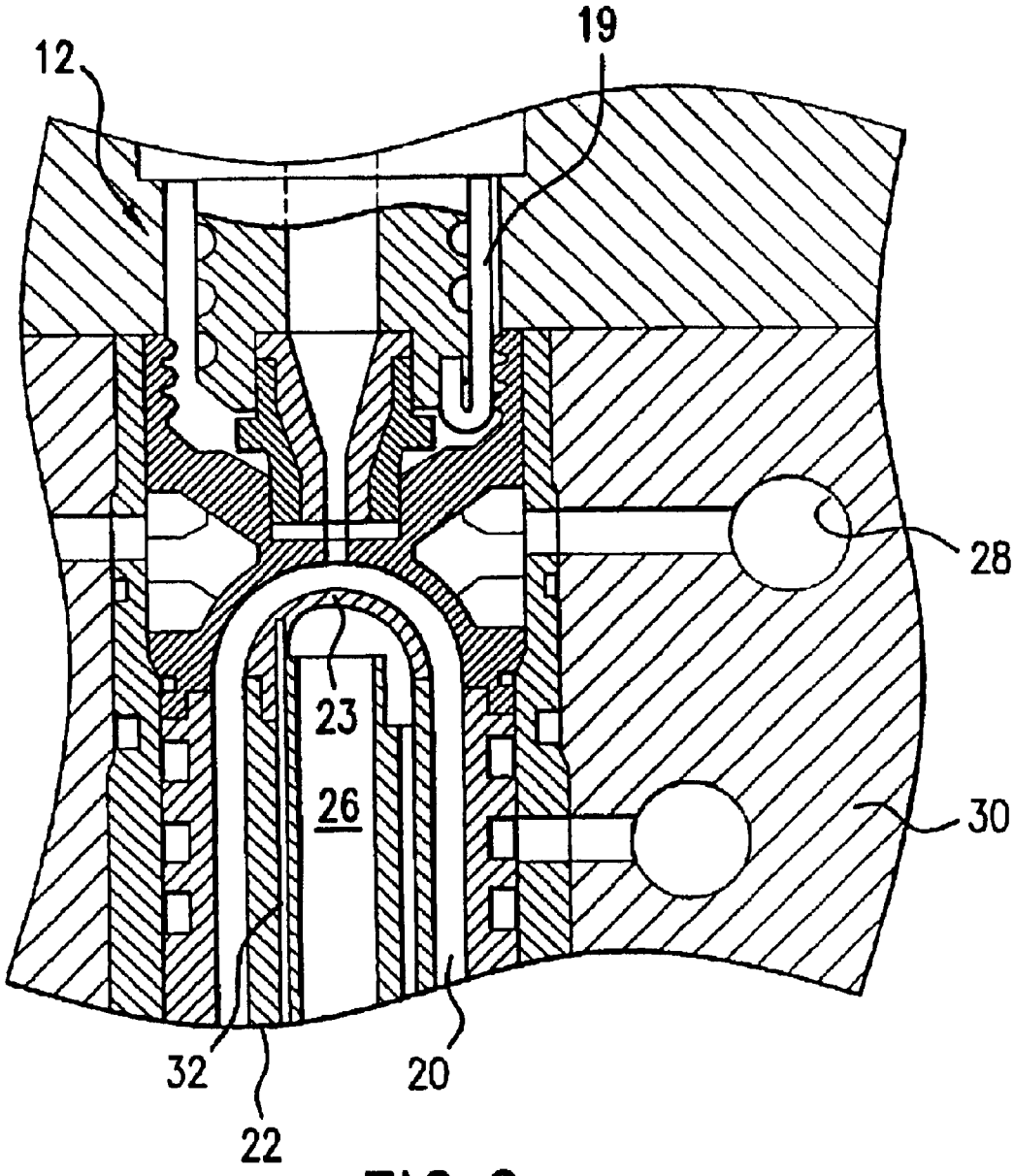
FIG. 2 is an enlarged view of a portion of the injection molding apparatus of FIG. 1 according another embodiment of the present invention.
Figure 3:
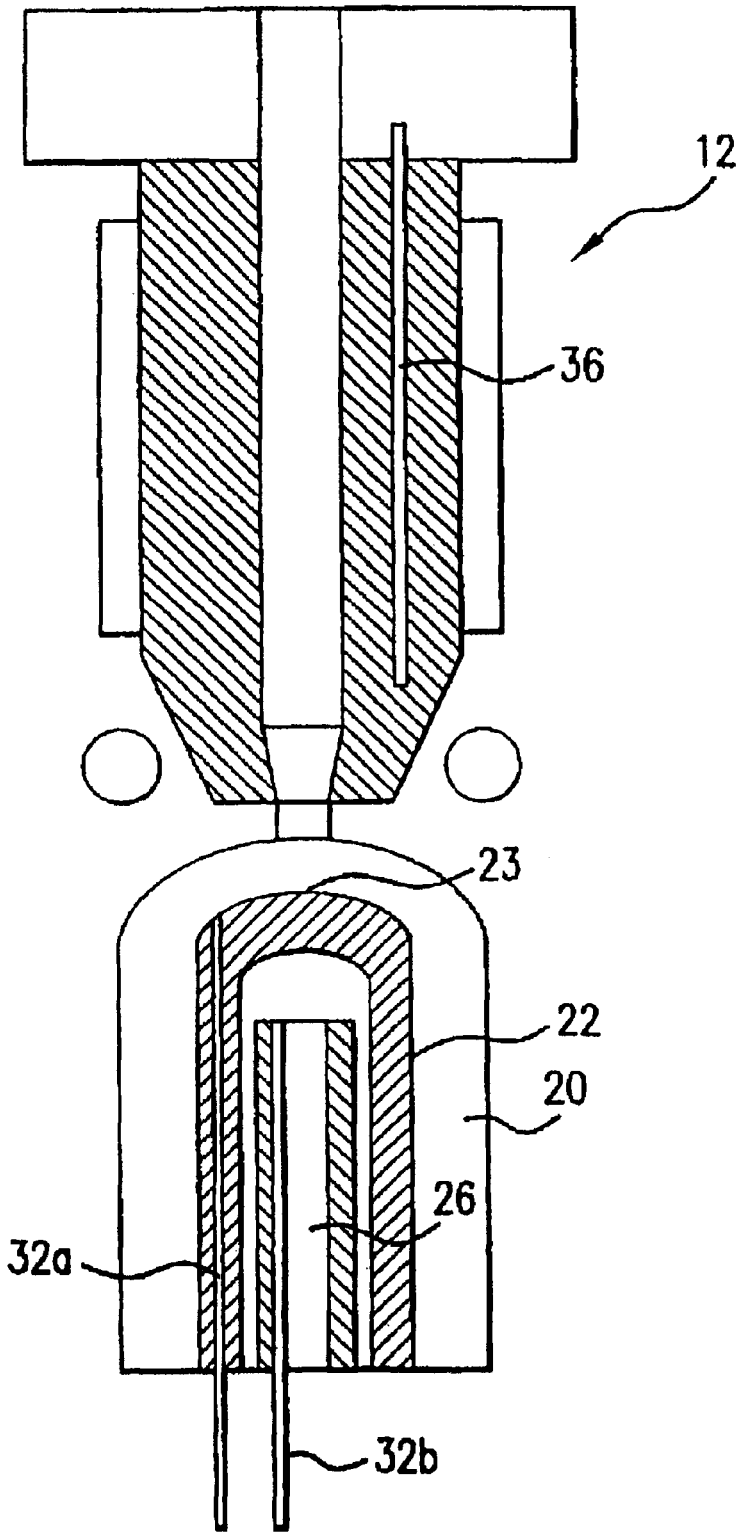
FIG. 3 is a schematic sectional view of an injection molding apparatus according to another embodiment of the present invention.

Turning now to FIG. 2, an alternative arrangement is shown. In this arrangement, the thermocouple 32 is located closer to the tip 23 of the mold core 22. In the arrangement of FIG. 3, a pair of thermocouples 32a and 32b are provided in the mold core 22. Specifically, the thermocouple 32a is located on the surface of the mold core 22 and the thermocouple 32b is located in the central fluid cooling duct 26.

In the injection molding apparatus of FIGS. 1, 2 and 3, the combination of the thermocouple 32, or thermocouples 32a and 32b, and the nozzle thermocouple 19 has the further advantage of providing a fail safe arrangement. If the nozzle thermocouple 19 fails for any reason, the temperature of the mold cavity 20 can still be determined using the thermocouple 32, 32a or 32b.

A different type of cooling core is disclosed in U.S. Pat. No. 6,077,067 to Gellert, issued on Jun. 20, 2000, the contents of which are herein incorporated by reference. It will be appreciated by a person skilled in the art that at least one thermocouple can be coupled to the cooling core of the Gellert patent in a similar manner as has been described in relation to FIGS. 1, 2 and 3.

Figure 4:
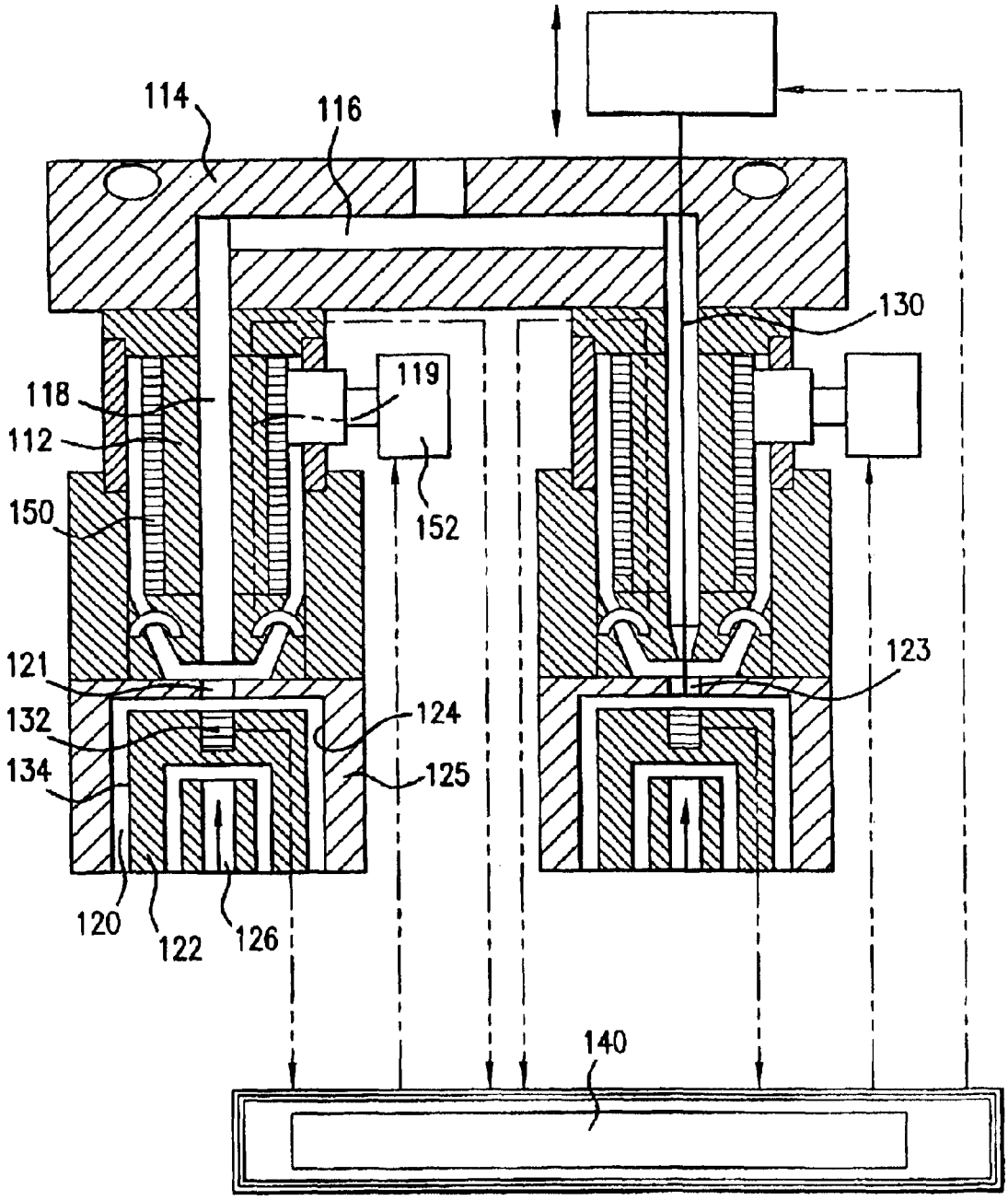
FIG. 4 is a sectional view of a portion of a multi-cavity injection molding apparatus according to still another embodiment of the present invention.

Referring to FIG. 4, a multi-cavity injection molding apparatus 100 for molding PET preforms, which is similar to the injection molding apparatus of FIG. 1, will now be described. The injection molding apparatus 100 includes a manifold 114 having a manifold melt channel 116 that extends therethrough. The manifold melt channel 116 is in communication with a machine nozzle (not shown) to receive a melt stream therefrom. Hot runner nozzles 112 include nozzle channels 118 for receiving a melt stream of molten material from the manifold melt channel 116. Nozzle heaters 150 are coupled to the nozzles 112 to heat the melt stream passing through each nozzle channel 118. The nozzle heaters 150 include heater controls 152, which are used to adjust the heater output. Mold cavities 120 are located adjacent a tip of each nozzle 112 and are in communication with the nozzle channels 118 to receive the flow of the molten material through respective mold gates 121 and 123.

The mold gate 121 is thermal gated and the mold gate 123 is valve gated. A valve pin 130 extends through the nozzle channel 118 to open and close the valve gate 123. This type of gating arrangement allows for the volume of melt flowing through the mold gate 123 to be adjusted. Valve pin gating systems are well known in the art and thus will not be described further herein.

Nozzle thermocouples 119 are coupled to the nozzles 112 to measure the temperature of the molten material as it is injected into the mold cavities 120.

Each mold cavity 120 is delimited by a first mold cavity surface 134 of a mold core 122 and a second mold cavity surface 124 of a mold plate 125. The first mold cavity surface 134 of the mold core 122 contacts an inner surface of the bottle preform and the second mold cavity surface 124 contacts an outer surface of the bottle preform. A central fluid cooling duct 126 extends through the mold core 122 to allow for cooling of the molded preform. A thermocouple 132 is provided in the mold core 122 of each mold cavity 120 to measure the temperature of the melt stream in the mold cavity 120. As shown, the thermocouple 132 is located at the tip of the mold core 122, however, it will be appreciated that the thermocouple 132 may be located at any other suitable point in the mold core 122.

A controller 140 is in communication with nozzle thermocouples 119 and mold cavity thermocouples 132 to receive temperature information therefrom. The controller 140 is also in communication with the heater controls 152 of the nozzle heaters 150 to allow the controller 140 to adjust the output of the nozzle heaters 150. The controller 140 is programmed to include at least predetermined target temperature data for melt in the mold cavity 120. The controller 140 includes a logic processor capable of comparing actual temperature measurements supplied by the thermocouples 132 to a predetermined target mold cavity temperature and calculating an input setting for the heater control 152 of each nozzle 118.

In operation, the melt stream flows under pressure though the manifold channel 116 into the nozzle channels 118 of a plurality of nozzles 112 of the injection molding apparatus 100. The melt stream is then injected into the mold cavities 120. As the injection process begins, temperature measurements are sent to the controller 140 from the nozzle thermocouple 119 and the mold cavity thermocouple 132. The controller 140 then compares the temperature of the mold cavity 120 with the target temperature. If the temperature of the mold cavity 120 is less than the target temperature, the controller 140 sends a signal to the heater control 152 to increase the heater output by a specified amount. Similarly, if the temperature of the mold cavity 120 is greater than the target temperature, the controller 140 sends a signal to the heater control 152 to decrease the heater output by a specified amount. The heater thermocouple 119 serves as a check to ensure that the nozzle heaters 150 are operating properly. The controller allows the temperature of the melt entering each mold cavity 120 to be independently adjusted in order ensure that the temperature of the melt is consistent for each mold cavity 120 in the injection molding apparatus 100.

Following injection, each mold cavity 120 is cooled by the coolant, which flows through the respective central fluid cooling ducts 126. Once a predetermined cooling time has elapsed the molded preforms are ejected from the mold cavities 120.

In the case of the mold gate 123 having a valve pin 130, the controller 140 may also control the stroke of the valve pin. This would allow the volume of melt entering the mold cavity to be adjusted in response to temperature information provided by the thermocouples 119, 132.

Figure 5:
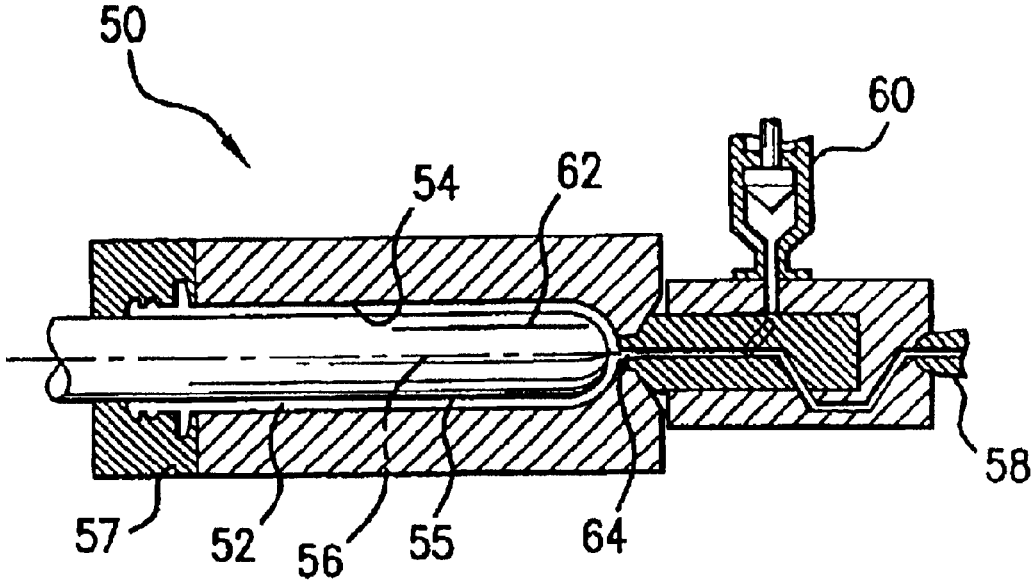
FIG. 5 is a co-injection molding apparatus according to the present invention.

Turning now to FIG. 5, a co-injection molding apparatus 50 is generally shown. This co-injection molding apparatus is similar to that disclosed in U.S. Pat. No. 4,609,516 to Krishnakumar et al., issued on Sep. 2, 1986, the contents of which are incorporated herein by reference. The co-injection molding apparatus 50 includes a mold cavity 52 delimited by a first mold cavity surface 55 of a mold core 56 and a second mold cavity surface 54 of a mold plate assembly 57. A thermocouple 62 is located on the mold core 56 to measure the temperature within the mold cavity 52. A second thermocouple (not shown) is installed downstream of the first thermocouple 62.

In the co-injection process, a first molten material is forced from a nozzle 58, through a mold gate 64, into the mold cavity 52, and then an interior molten barrier layer is forced into the first material via a second material dispenser 60. The finished product is a molded article having a barrier layer that is surrounded by a first material layer. During the co-injection process, the first molten material layer cools in the mold cavity 52 and becomes an insulator for the molten barrier layer. In order to ensure a high quality molded product, it is critical to measure the temperature of each molten material at the entrance to the mold cavity 52. The thermocouples located on the mold core 56 provide important information to an operator so that temperature can be optimized to produce high quality molded products.

The thermocouples 62 may alternatively be installed in a manner similar to thermocouples 32a and 32b, shown in FIG. 3.

Turning to FIG. 6, a schematic depiction of an injection molding apparatus 80 having gates 82 equipped with axially movable valves 84 for adjusting the gate size is shown. The valves 84 are controlled by drivers 86. The injection molding apparatus 80 of FIG. [5] *6* has a large mold cavity 88. This molding apparatus is similar to that disclosed in U.S. Pat. No. 5,556,582 to Kazmer, issued on Sep. 17, 1996, the contents of which are also incorporated herein by reference.

In a large mold cavity, such as mold cavity 88 of FIG. 6, it is important that the molten material remains at a predetermined temperature while the mold cavity is filled. If the molten material begins to cool before the mold cavity fills up, the quality of the resulting molded product is compromised. Typically, thermocouples [(not shown)] *92* are located at each gate 82 so that the temperature of the molten material is measured as it flows into the mold cavity 88. Second thermocouples 90 are provided at a predetermined distance from each gate 82 in order to provide additional temperature measurements of the molten material in the mold cavity 88. The additional thermocouples 90 provide information so that the temperature variation of the molded article in the mold cavity 88 can be monitored.

The co-injection molding apparatus 50 of FIG. 5 and the injection molding apparatus 80 of FIG. 6 may also include a controller 40. The controller 40 would operate as has been described in relation to the injection molding apparatus 100 of FIG. 4 to allow for the temperature of the melt stream entering the mold cavity to be adjusted in response to temperature information provided by the thermocouple in the mold cavity.

It will be appreciated by a person skilled in the art that the thermocouples discussed in this application may be any type of thermocouple that is suitable for use in an injection molding apparatus. Alternatively, in addition, wire-wound resistance temperature detectors, thermistors and solid state sensors may be used. In a preferred embodiment, the thermocouples 119 and 132 are replaced with thin-film resistance temperature detectors manufactured by Minco Products Inc.

Although preferred embodiments of the present invention have been described, those of skill in the art will appreciate that variations and modifications may be made without departing from the spirit and scope thereof as defined by the appended claims. All patents and publications discussed herein are incorporated in their entirety by reference thereto.

I claim:

1. An injection molding apparatus comprising:

a manifold having a manifold channel;

a mold cavity having a mold core with a melt temperature sensor;

a nozzle having a nozzle body, a nozzle channel and a nozzle heater, wherein the nozzle channel is in fluid communication with the manifold channel and with the mold cavity through a mold gate; and a controller electrically coupled to the melt temperature sensor to control the nozzle heater.

2. The injection molding apparatus of claim 1, wherein the nozzle heater is located in a groove disposed in the nozzle body.

3. The injection molding apparatus of claim 1, wherein the nozzle heater is a sleeve heater that is disposed about the nozzle body.

4. The injection molding apparatus of claim 1, wherein the mold core includes a cooling duct.

5. The injection molding apparatus of claim 4, further comprising a second melt temperature sensor disposed within the cooling duct, wherein the controller is electrically coupled to the second melt temperature sensor.

6. The injection molding apparatus of claim 5, wherein the melt temperature sensor is disposed on a surface of the mold core.

7. The injection molding apparatus of claim 1, wherein the controller is electrically coupled to the nozzle heater through a heater control unit.

8. The injection molding apparatus of claim 1, further comprising:

a nozzle temperature sensor disposed about [a] *the mold* gate *and coupled to the controller*.

9. The injection molding apparatus of claim 1, wherein the nozzle is valve-gated.

10. [An] *The* injection molding apparatus [comprising:

a manifold;

a mold cavity having a mold core and a] *of claim 1 wherein*

*the* melt temperature sensor *is* disposed in a hole in a wall of the mold core;

[a nozzle having a] *the* nozzle heater [that] is located in a groove disposed in [a body of the nozzle and] *the nozzle body, and the nozzle has* a nozzle temperature sensor disposed adjacent to [a] *the* mold gate; and

[a] *the* controller *is* electrically coupled to the nozzle temperature sensor and the melt temperature sensor to control the nozzle heater.

11. The injection molding apparatus of claim 10, further comprising: a second melt temperature sensor, wherein the mold core includes a cooling duct and the melt temperature sensor is disposed within the cooling duct.

12. The injection molding apparatus of claim 10, wherein the melt temperature sensor is disposed in a tip of the mold core.

13. An injection molding apparatus comprising:

a manifold;

a plurality of nozzles each having a nozzle heater *and a nozzle temperature sensor*;

at least one mold cavity having a melt temperature sensor disposed adjacent to the mold cavity; and a controller electrically coupled to the melt temperature sensor *and the nozzle temperature sensor of at least one of the plurality of nozzles* to control *the nozzle heater of the* at least one of the plurality of [nozzle heaters] *nozzles*.

14. The injection molding apparatus of claim 13, wherein the mold cavity includes a mold core.

15. The injection molding apparatus of claim 14, wherein the melt temperature sensor is disposed within the mold core.

16. The injection molding apparatus of claim 13, wherein the controller is electrically coupled to the nozzle heaters through a heater control unit.

[17. The injection molding apparatus of claim 13, wherein at least one of the plurality of nozzles includes a nozzle temperature sensor and the controller is electrically coupled to the at least one nozzle temperature sensor to control the nozzle heater.]

18. The injection molding apparatus of claim 1, wherein the nozzle includes a nozzle temperature sensor and the controller is electrically coupled to the nozzle temperature sensor to control the nozzle heater.

19. A method of injection molding comprising the steps of:

delivering a melt stream of molten material from a manifold channel of a manifold under pressure through a nozzle channel of a nozzle and into a mold cavity;

*measuring a temperature of the molten material at the nozzle channel using a nozzle temperature sensor coupled to a controller;* measuring the temperature of the molten material in the mold cavity using a melt *cavity* temperature sensor *coupled to the controller*; and controlling the temperature of the molten material by adjusting the output of a nozzle heater located on the nozzle based on the measurement of the temperature of the molten material measured by the melt *cavity* temperature sensor *and the nozzle temperature sensor*.

[20. The method of injection molding of claim 19, further comprising the steps of:

providing the nozzle with a nozzle temperature sensor;

measuring the temperature of the molten material in the mold cavity using the nozzle temperature sensor; and controlling the temperature of the molten material by adjusting the output of the nozzle heater based on the measurement of the temperature of the molten material measured by the nozzle temperature sensor.]

21. The method of injection molding of claim [20] *19*, wherein the nozzle temperature sensor measures the temperature of the molten material at a mold gate.

*22. The injection molding apparatus of claim 1 wherein the nozzle includes movable valve pin for controlling the flow of melt into the mold cavity, the controller being electrically coupled to the valve pin to adjust movement thereof in response to information from the melt temperature sensor.*

*23. The injection molding apparatus of claim 13 including a plurality of mold cavities each having a respective melt temperature sensor disposed adjacent thereto, each mold cavity being associated with a respective nozzle to receive melt therefrom, the controller being electrically coupled to each of the melt temperature sensors and the nozzle temperature sensors to independently control the nozzle heaters of the plurality of nozzles.*

*24. An injection molding apparatus comprising:*

*a manifold having a manifold channel for receiving a melt stream of molten material under pressure;*

*a nozzle having a nozzle channel for receiving the melt stream from the manifold channel, the nozzle having a nozzle heater;*

*a mold cavity for receiving the melt stream from said nozzle, said nozzle channel communicating with said mold cavity through a mold gate;*

*a melt temperature sensor located adjacent the mold cavity near the mold gate for measuring a temperature of the molten material in said mold cavity near the mold gate; and*

*a controller coupled to the melt temperature sensor and the nozzle heater for controlling the nozzle heater in response to measurements from the melt temperature sensor.*

*25. The injection molding apparatus of claim 24 wherein said nozzle has a nozzle temperature sensor coupled to the controller and said nozzle temperature sensor is used to measure the temperature in the proximity of a nozzle tip.*

*26. The injection molding apparatus of claim 24 wherein the flow of melt from the nozzle to the mold cavity is controlled by a movable valve pin and the movement of said valve pin is controlled by the controller in response to measurements from the melt temperature sensor.*

*27. An injection molding apparatus comprising:*

*a manifold having a manifold channel for receiving a melt stream of molten material under pressure;*

*at least two nozzles each having a nozzle channel for receiving the melt stream from the manifold channel;*

*a mold cavity for receiving the melt stream from said nozzles, each of said nozzle channels communicating with said mold cavity through a separate mold gate;*

*a pair of first melt temperature sensors and a pair of second melt temperature sensors located in the mold cavity, each of the first melt temperatures sensors being close to a respective one of the mold gates to provide temperature measurements, each of the second melt temperature sensors being located at a predetermined distance from a respective one of mold gates to provide additional temperature measurements of the melt inside the mold cavity; and*

*a movable valve pin located in each nozzle channel movable to control the flow of melt from each nozzle through the mold gates into said mold cavity.*

* * * * *